United States Patent
Evans et al.

(10) Patent No.: US 6,297,798 B1
(45) Date of Patent: Oct. 2, 2001

(54) METHOD AND APPARATUS FOR DYNAMICALLY INTERPRETING DRAWING COMMANDS

(75) Inventors: Charles Evans, Madison; Per Blomqvist, Huntsville; John Schwartz; Eric Mawby, both of Madison, all of AL (US)

(73) Assignee: Intergraph Corporation

( * ) Notice: Subject to any disclaimer, the term of this patent is extended or adjusted under 35 U.S.C. 154(b) by 0 days.

(21) Appl. No.: 09/092,332

(22) Filed: Jun. 5, 1998

Related U.S. Application Data

(63) Continuation of application No. 08/435,348, filed on May 5, 1995, now Pat. No. 5,764,936.

(51) Int. Cl.$^7$ .................................................. G06F 15/00
(52) U.S. Cl. ......................................... 345/145; 345/333
(58) Field of Search ................................. 345/326–358, 345/145–146

(56) References Cited

U.S. PATENT DOCUMENTS

| | | | |
|---|---|---|---|
| 4,807,143 | 2/1989 | Matsuura | 364/468 |
| 5,371,845 | 12/1994 | Newell et al. | 395/155 |
| 5,414,809 | 5/1995 | Hogan et al. | 395/155 |
| 5,465,324 | 11/1995 | Lee et al. | 395/133 |
| 5,504,917 | 4/1996 | Austin | 395/800 |
| 5,632,008 | 5/1997 | Yokoyama . | |
| 5,764,936 | * 6/1998 | Evans et al. | 345/326 |

FOREIGN PATENT DOCUMENTS

| | | |
|---|---|---|
| 0 723 217 | 7/1996 | (EP) . |
| 07 244741 | 9/1995 | (JP) . |

OTHER PUBLICATIONS

Mander, Richard et al., "A 'Pile' Metaphor for Supporting Casual Organization of Information," Striking a Balance, Monterey, May 3–7, 1992, pp. 627–634, XP000426843.

Kurtenbach, Gordon et al., "Issues in Combining Marking and Direct Manipulation Techniques," in Proceedings of the Symposium on User Interface Software and Technology (UIST), Hilton Head, South Carolina, Nov. 11–13, 1991, No. Symp. 4, Nov. 11, 1991, Association for Computing Machinery, pp. 137–144, XP000315074.

Advanced Chartist, Pardo Corporation, Evanston, IL (Users Manual), Jun. 1987.

\* cited by examiner

*Primary Examiner*—Steven Sax
(74) *Attorney, Agent, or Firm*—Townsend and Townsend and Crew LLP

(57) ABSTRACT

A method for resolving ambiguities in user input to a computer-aided drawing package. The number of necessary commands is therefore reduced. To draw an element, the user selects a particular drawing command. The user then manipulates a pointing device to select points that further define the position and shape. In accordance with the invention, the point selections can be interpreted in more than one way. A region surrounding at least one of the selected points is divided into so-called intent zones. After, this point is selected, the drawing package monitors cursor movement through this region. The particular intent zone that the cursor traverses determines the interpretation of the point selections following the command.

20 Claims, 8 Drawing Sheets

Microfiche Appendix Included
(1 Microfiche, 78 Pages)

METHOD AND APPARATUS FOR DYNAMICALLY INTERPRETING DRAWING COMMANDS

This application is a continuation of Ser. No. 08/435,348 May 5, 1995 U.S. Pat. No. 5,764,936

SOURCE CODE APPENDICES

A microfiche appendix (1/78) of Visual C++ language source code for a preferred embodiment (©1995 Intergraph) are filed herewith. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to a computer-aided drawing system. More particularly, the present invention relates to a system and method for reducing the number of different user commands needed to define an element to be drawn.

Computer-aided drawing packages are known in which a user interactively draws an object on a screen using a series of cursor manipulations and/or keyboard commands to define the shape and size of the object. Typically, one creates an illustration by combining basic geometric objects such as arcs, lines, circles etc. These packages find application in computer-aided design (CAD), for example.

Typically, the process of drawing an object begins with the user selecting a particular drawing command either via the keyboard or by use of a pointing device to access pull-down menus or a toolbar. The choice of initial command selects a basic geometric object to be drawn, whether it be a line, arc, or some other element. After the initial command, the user employs a pointing device, moving a cursor to specify a series of points that determine the size and shape of the object. The computer-aided drawing system interprets the point selections based on the initially selected command and draws the specified object accordingly.

The above description of the computer-aided drawing process will be made clearer with reference to a simple example. To draw a line segment, the user might begin by selecting a line drawing command by using a mouse to position a cursor over a line icon on a toolbar and then depressing a mouse button. The user would then position the cursor at a first point and again depress the mouse button. The drawing package would interpret this first selected point as the first endpoint of the line. The user would continue by positioning the cursor at a second point and depress the mouse button again. The computer-aided drawing package would interpret the second point as the second end of the line segment and draw the line segment to connect the first and second points.

In the above example, the user's actions may be interpreted by the drawing package unambiguously. The two points identified by the user clearly denote the endpoints of the line. Indeed, using the mouse in the above-described fashion is probably the most natural approach to line drawing for a user experienced with graphical user interfaces.

However, for other basic geometric objects, ambiguities may arise in interpreting user input. Consider the steps of drawing an arc. The user would begin by selecting an arc icon from the toolbar. The first point selected by the user is interpreted as a first end of the arc. Some drawing packages then interpret a second selected point as a midpoint of the arc and a third selected point as the endpoint of the arc. Others interpret the second point to be the endpoint and the third point to be the midpoint.

A problem thus arises in that users will bring their previous experience with arc drawing to a new drawing package and expect their cursor movements to be interpreted in accordance with a particular one of these alternative methods. Users will become confused if, e.g., the point they thought was selected to be an endpoint instead becomes a midpoint of the arc.

A possible solution is to present two distinct initial commands corresponding to the different methods of interpreting the second and third points. The user could select the preferred command at the outset, removing any ambiguities.

Increasing the number of commands in this way carries serious drawbacks. The arc example given above is but one example of the ambiguities that can arise in drawing objects. Thus, numerous extra commands would need to be added to pull-down menus and toolbars, increasing system complexity. The user would further need to be trained to consider the possible ways his actions could be interpreted and select a particular command accordingly.

SUMMARY OF THE INVENTION

The invention provides a method for resolving ambiguities in user input to a computer-aided drawing package. The number of necessary commands is therefore reduced. To draw an element, the user selects a particular drawing command. The user then manipulates a pointing device to select points that further define the position and shape. In accordance with the invention, the point selections can be interpreted in more than one way. A region surrounding at least one of the selected points is divided into so-called intent zones. After this point is selected, the drawing package monitors cursor movement through this region. The particular intent zone traversed by the cursor determines the interpretation of the point selections following the command. In accordance with the invention, the geometric arrangement of the intent zones may be varied to provide the most plausible interpretation of the user's actions.

In accordance with a first aspect of the invention, a user draws an arc by first selecting an arc command. The user then moves a cursor to a first desired endpoint of the arc and selects the point by depressing a mouse button or in some other way. The user then similarly selects a second point and a third point of the arc. A small circular region surrounding the second point is divided into two intent zones. A first intent zone may comprise the side of the circle facing toward the first point. A second intent zone may comprise the side of the circle facing away from the first intent zone.

If after defining the second point, the user moved the cursor through the first intent zone, the second point is interpreted to be an endpoint of the arc. If, on the other hand, the user had moved the cursor through the second intent zone, the third point is understood to be an endpoint. This response corresponds to the most plausible interpretation of the user's actions.

In accordance with a second aspect of the invention, a user draws an arc either tangent or perpendicular to an existing line. The user first selects an arc command. The user then selects a point on the existing line as a first endpoint of the arc. A second point and/or keyboard input further define the arc. A small circular region surrounding the first point is divided into four wedge shaped intent zones. First and second intent zones oppose one another, touching at the center of the circle, and are traversed by the existing line. Third and fourth intent zones occupy the gaps between the first and second intent zones.

If after the defining the first point, the user moved the cursor through either the first or second intent zones, the arc will be drawn tangent to the existing line. If on the other hand, the user had moved the cursor through one of the third or fourth intent zones, the arc will be drawn perpendicular to the existing line. Thus, through the use of intent zones, the invention combines two arc drawing commands into one without the use of special modes.

In accordance with a third aspect of the invention, a user draws an arc by first selecting an arc command, wherein a first point selected by the user defines the center of the arc. The user selects a second point to be a first endpoint of the arc. A third point selected by the user and/or keyboard input further defines the shape and/or extent of the arc. A region surrounding an imaginary line extending from the first point through the second point is divided into two intent zones. A first intent zone is the portion of the region above the imaginary line and the second intent zone lies below the imaginary line.

If after defining the second point, the user moved the cursor through the first intent zone, the arc will be drawn to extend from the second point in the direction of the first intent zone. If on the other hand, the user moved the cursor through the second intent zone, the arc will be drawn to extend from the second point in the direction of the second intent zone. Thus, two possible arc orientations can be determined with a single command.

In accordance with a fourth aspect of the invention, the user draws a line perpendicular to an existing arc or circle. The user selects a line drawing command. The user athen selects a first point on the line or circle as a first endpoint of the line. A second point selected by the user and/or keyboard input further defines the line. A circular region surrounding the first selected point is divided into four wedge-shaped intent zones. First and second intent zones oppose one another, touching at the center of the circle, and are traversed by an imaginary line tangent to the existing circle or arc. Third and fourth intent zones occupy the gaps between the first and second intent zones.

If after defining the first point, the user moved the cursor through either the first or second intent zones, the line will be drawn tangent to the existing circle or arc. If on the other hand, the user had moved the cursor through the third or fourth intent zones, the line will be drawn perpendicular to the existing circle or arc. Thus, through the use of intent zones, the invention combines two arc drawing commands into one.

In accordance with the invention, the geometric arrangement of the intent zones may be varied.

The invention will be better understood by reference to the following detailed description in connection with the accompanying drawings.

DESCRIPTION OF SPECIFIC EMBODIMENTS

Figure 1A:
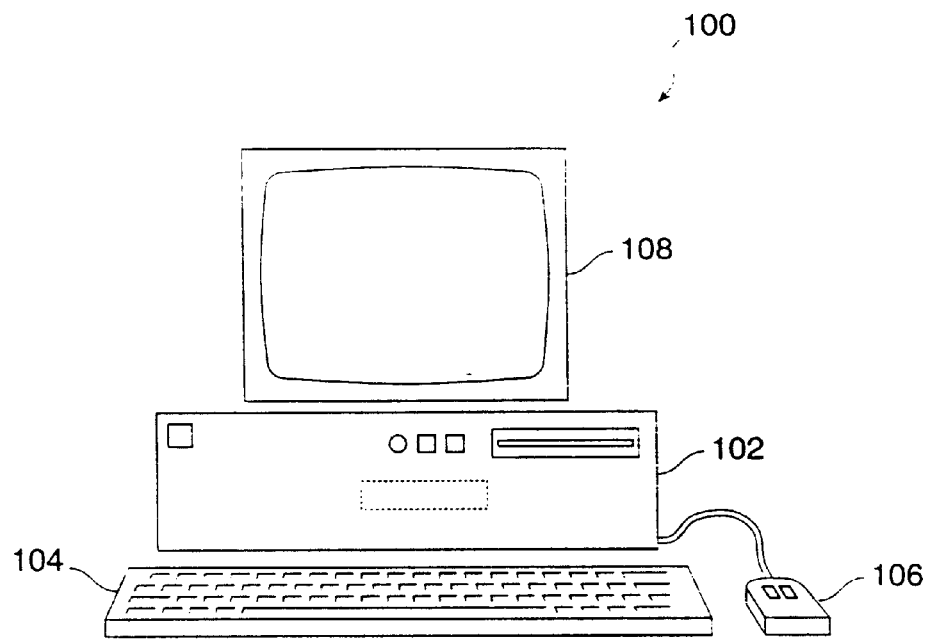
FIG. 1A is a block diagram of an exemplary hardware configuration for a computer system in which the present invention may be implemented.

FIG. 1A shows a preferred computer system 100 in which the present invention may be implemented. A processing unit 102 contains the control elements of the computer system 100. Keyboard 104 and mouse 106 are coupled to processing unit 102 and enable the system user to input commands and data to computer system 100. Display device 108 serves as the final element of the user interface, where the user can see the results of the inputs to keyboard 104 and mouse 106 and the effect of those inputs in an application program.

Figure 1B:
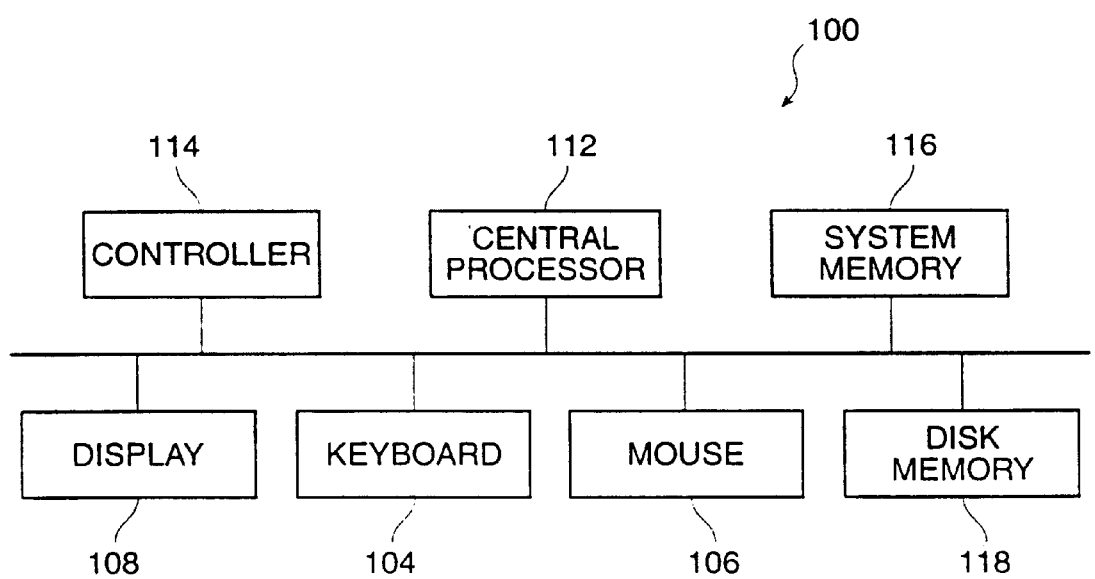
FIG. 1B is a system architecture block diagram of the computer system of FIG. 1A.

FIG. 1B shows a system architecture block diagram of the computer system of FIG. 1A. The system elements are interconnected by system bus 110. In addition to keyboard 104, mouse 106 and display 108, the control elements included in processing unit 102 are shown. Central processor (CPU) 112 and controller 114 control operation of computer system 100. Program and data information are stored in system memory 116 and disk memory 118. A computer-aided drawing package of the present invention which allows the user to create and manipulate objects on a simulated drawing sheet depicted on display device 108 is operably disposed in system memory 116 and disk memory 118.

A user draws on the simulated drawing sheet by interactively constructing a series of simple geometric elements and combining them. During the interaction, the user may employ mouse 106 and/or keyboard 104 to specify the location and characteristics of each geometric object. Of course, these input devices are merely representative of hardware usable for input to the system of the present invention. Joysticks, digitizing pads, voice recognition, and other devices could also be used for pointing and data entry. An alternative implementation would be a pen-based computer system with an integral screen and writing tablet.

Interaction between the user and drawing package consists of various user actions and responses by the package. Cumulatively, the user actions can be understood as a language of geometric construction and manipulation. The package understands this language and responds appropriately to instructions.

Construction of a basic geometric object typically begins with the user selecting-a particular command. The user can employ mouse 106 to select the command from a pull-down menu or from a toolbar. Another alternative is use of a key combination on keyboard 104. Examples of commands in the preferred embodiment include "line", "arc by 3 points", and "arc by center." The selected command provides a context for interpreting the user actions that follow.

A large part of the user-computer interaction centers around display and movement of a cursor. The drawing package displays an image of a cursor on the simulated drawing sheet. The user controls the position of the cursor by manipulating mouse 106 or by use of some other pointing device.

To specify a point, the user may place the cursor at a desired location and then depress a button on mouse 106 or a key on keyboard 104. The drawing package may then display the point.

A refinement of this point placement provision would be provision of a grid. Instead of displaying the point at the exact cursor location, the point may instead be located at the nearest gridpoint on an imaginary or displayed grid. Other ways of constraining point location may also be provided depending on the geometric object that is being constructed.

Keyboard entry is another form of user input. The drawing package provides displayed data fields for numerical entry of line lengths, arc sweep angles, arc radii, etc. The user can simply type in the desired parameter.

The typical sequence for construction of a geometric object consists of selection of a command followed by point selection and/or data entry. For example, for a line, the user could begin by selecting a line icon from the toolbar. The user would then select the two endpoints of the line segment in sequence. The drawing package would respond by drawing a line segment between the two endpoints. An alternative procedure would be to select the first endpoint, and then use the keyboard to enter a line length and an angle.

If a grid mode is set, both points may be restricted to the gridpoints. It is also possible to constrain the second endpoint to restrict the angle of the line to a limited set of values. If a pre-existing geometric object is near, the second endpoint can also be constrained to coincide with the pre-existing object.

The drawing package of the preferred embodiment also displays intermediate graphical images to aid the user. For example, after selection of the first point of a line segment, the drawing package displays a line segment in dotted-line form between the current cursor position and the first point. If grid mode is set, the drawing package would display a dotted-line line segment between the gridpoint nearest the current cursor position and the first selected point. Other constraints would be handled similarly.

The invention provides an additional technique for interpreting user movement of the cursor when constructing geometric objects. The technique of the invention will first be discussed generally. A discussion of the application of the technique to specific examples of object construction and combination follows.

Figure 2:
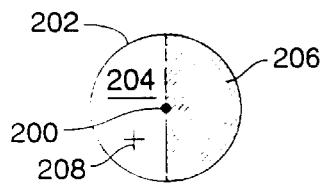
FIG. 2 illustrates how cursor movement through a region surrounding a point selected by a user is monitored in accordance with the invention.

In accordance with the present invention, one or more points selected by the user during the course of object construction are surrounded by a region divided into two or more intent zones as hereinafter defined. FIG. 2 depicts such a point 200 surrounded by a region 202 divided into two intent zones 204 and 206. A cursor 208 is depicted within intent zone 204.

After point 200 has been selected by the user, the drawing package monitors movement of cursor 208 through region 202. As the user moves cursor 208 away from point 200, the cursor passes through one or both of intent zones 204 prior to a next point selection. The drawing package records the identity of the last intent zone traversed by cursor 208 prior to the next point selection. As will be made clear with reference to specific examples, the identity of this last intent zone is used to interpret the sequence of user actions that specify the location and characteristics of a geometric object to be drawn.

Region 202 is shown as being circular but other shapes are possible in accordance with the invention. In the preferred embodiment, region 202 is ten pixels in circumference but other sizes are possible.

Two intent zones are shown in FIG. 2 but this number may vary depending on the application. The size and shapes of the intent zones themselves may also vary. Also, the intent zones may or may not be displayed.

The movement of cursor 208 through region 202 thus becomes another part of the language of interaction understood by the drawing package of the invention. In the context of arc drawing for example, the choice of intent zone may signify whether an arc is to be drawn with the second selected point as a midpoint and the third point as an end point or vice versa. If an arc is to be combined with an existing line, the choice of intent zone may determine whether the arc is to be drawn tangent or perpendicular to the existing line. These are but representative examples and the intent zones have numerous possible applications.

In general, one particularly beneficial effect provided by the intent 2one feature of the present invention is a reduction in the number of commands needed to achieve the same flexibility in user control. As in spoken or written language, where the same word may have different meanings in different contexts, movement of the cursor 208 through region 202 provides a context for interpretation of commands. A single command can thus take on more than one meaning. This results in a more compact toolbar, easier training of users, and a generally less cumbersome drawing system.

Figure 3A:
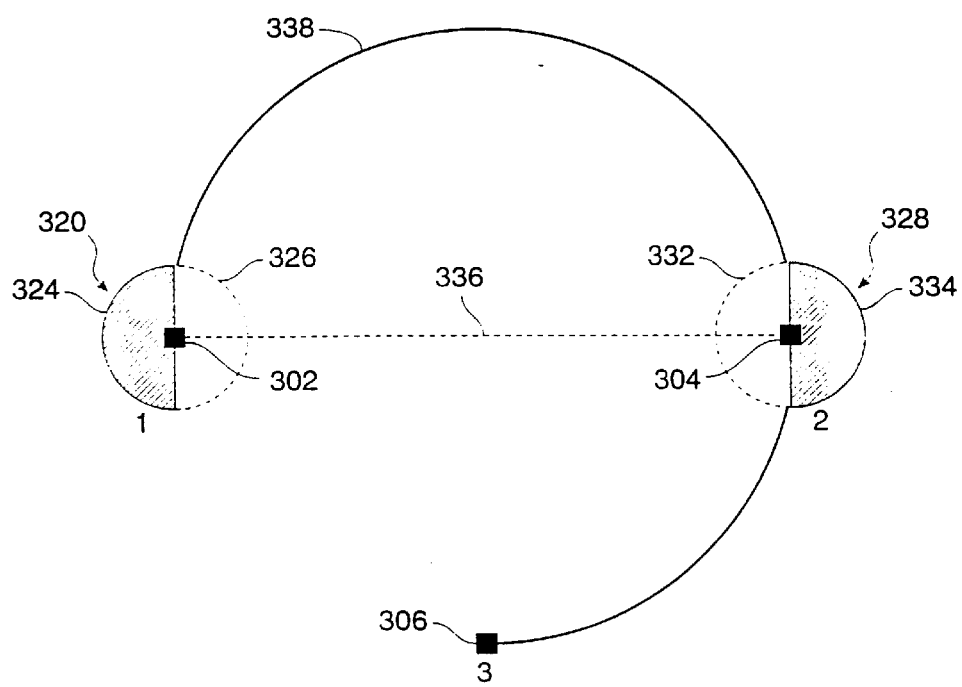
FIGS. 3A–3D depict how arcs may be drawn by specifying points along the arc, wherein a second specified point may be intended to be a midpoint or an endpoint of the arc and the user's intent is interpreted in accordance with the invention.
Figure 3B:
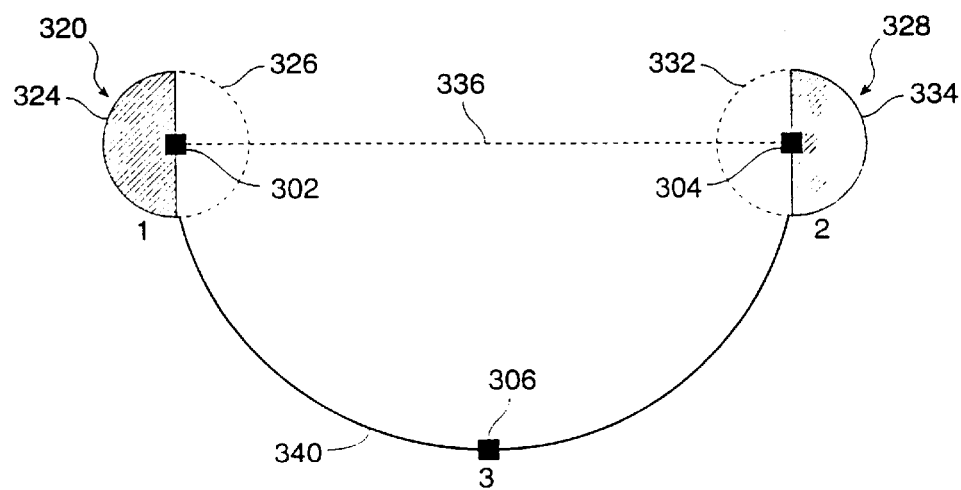
Figure 3C:
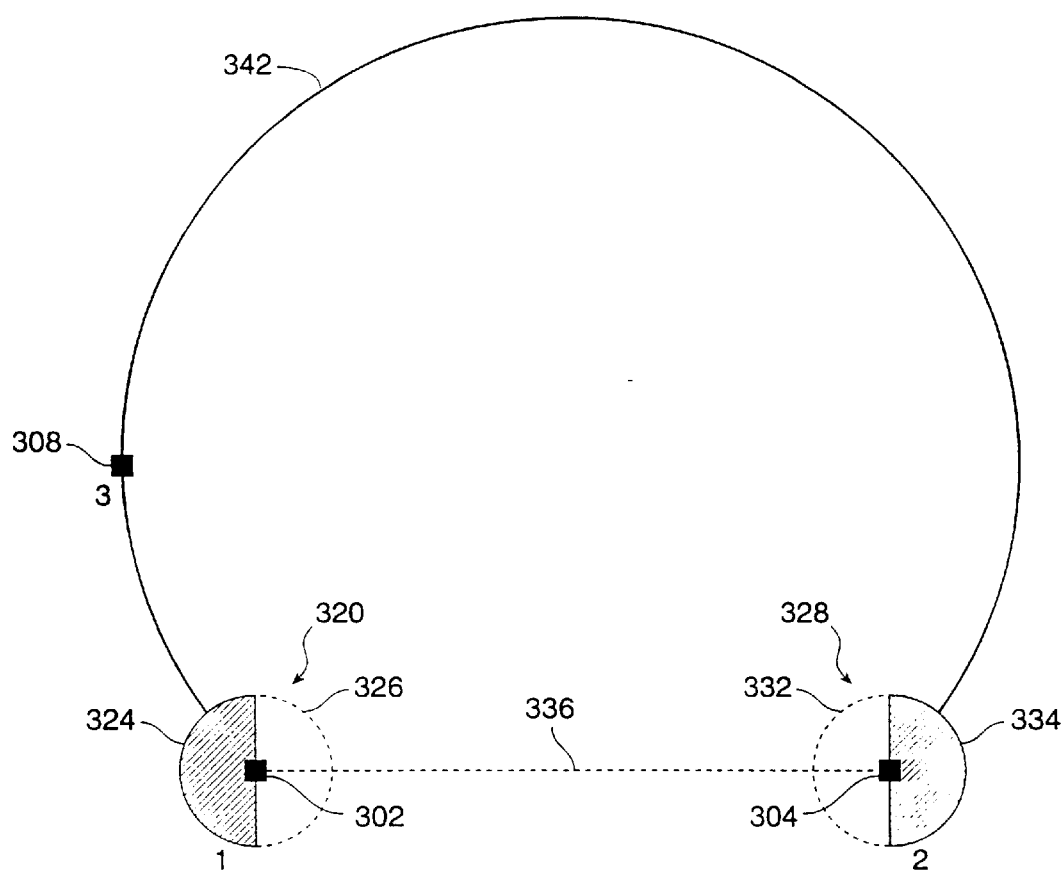
Figure 3D:
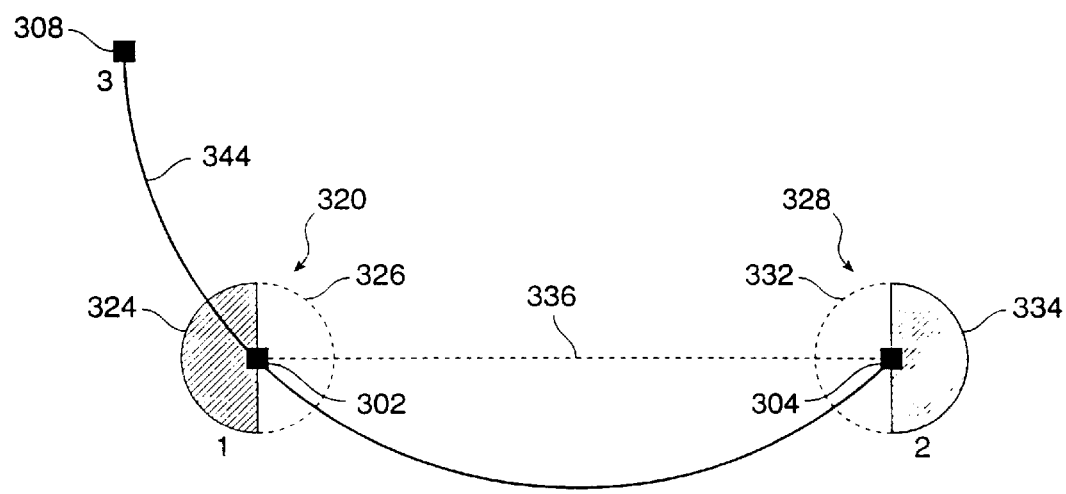

FIGS. 3A–3D depicts how arcs may be drawn by specifying points along the arc, wherein a second specified point may be intended to be a midpoint or an endpoint of the arc and the user's intent is interpreted in accordance with the invention. FIGS. 3A–3D show first and second selected points 302 and 304 for determining an arc. FIGS. 3A–3B show a third point 306 as a possible location for a third selected point that determines the arc. FIGS. 3C–3D show a third point 308 as another possible location for a third selected point that determines the arc.

A first region 320 surrounding first selected point 302 is divided into left and right intent zones 324 and 326. A second region 328 surrounding second selected point 304 is divided into left and right intent zones 332 and 334. The terms "left" and "right" as applied to the intent zones refer to the arrangement of FIGS. 3A–3D. In the preferred embodiment, the regions 320 and 328 are circular and the intent zones 324, 326, 330, and 332 are semicircular. For each of regions 320 and 328, the line dividing the intent zones is perpendicular to an imaginary line 336 between the first and second selected points 302 and 304.

FIG. 3A depicts an arc 338, wherein the endpoints of the arc are first selected point 302, and third selected point 306, and a midpoint of the arc is second selected point 304. To draw arc 338 in accordance with the invention, the user would begin by selecting an arc command via a toolbar, a pulldown menu, or in some other way. The user would then select first point 302 and second point 304 in sequence. As the cursor was being moved away from second point 304, it should be moved through right intent zone 334. Movement of the cursor through right intent zone 334 signifies that second selected point 304 is to be the midpoint of the arc. Finally, the user selects third point 306 which becomes the second endpoint.

FIG. 3B depicts an arc 340 designated by the same points 302, 304, and 306. However, here second selected point 304 is an endpoint and third selected point 306 is a midpoint. The procedure to construct this arc 340 in accordance with the invention is similar to what was discussed in reference to FIG. 3A. The difference is that instead of moving the cursor away from second selected point 304 through right intent zone 334, the cursor is instead moved through left intent zone 332 to indicate that second selected point 304 is to be an endpoint. Third selected point 306 will be a midpoint so long as region 320 is not retraversed as will be discussed in reference to FIG. 3D.

FIG. 3C depicts an arc 342, wherein first selected point 302 is a first endpoint, second selected point 304 is an endpoint, and third selected point 308 is a midpoint. To draw arc 342 in accordance with the invention, the user would first select the same arc command utilize to construct the arcs of FIGS. 3A–3B. The user would then specify first and second points 302 and 304 in order. In moving the cursor away from second selected point 304, the user would move the cursor through left intent zone 332. As in FIG. 3B, the drawing package interprets the cursor movement through this intent zone to indicate that second selected point 304 is to be an endpoint. Finally, the user selects third point 308.

FIG. 3D depicts an arc 344, designated by the same points 302, 304, and 308 that designate arc 344 of FIG. 3C. Here, first selected point 302 is a midpoint, second selected point 304, is a first endpoint, and third selected point 308 is a second endpoint. To draw arc 344 in accordance with the invention, the user would first select the arc command discussed in reference to FIGS. 3A–3C. The user would then select first point 302 and second point 304 in order. In moving the cursor away from second selected point 304, the user would move the cursor through left intent zone 332. In further moving the cursor toward third selected point 308, the cursor moves through region 320 surrounding first selected point 302. In exiting region 320, the cursor last traverses left intent zone 324. This sequence of cursor movement indicates that first selected point 302 is to be a midpoint, second selected point 304 is to be an endpoint, and third selected point 306 is to be an endpoint.

It is clear from the above that selecting the same arc command and specifying the same three points can result in completely different arcs depending on how regions 320 and/or 328 are traversed. The use of intent zones in accordance with the invention corresponds to an intuitive method of drawing arcs. Those users accustomed to specifying the third point to be an endpoint will naturally move the cursor beyond second selected point 304 and through right intent zone 334. On the other hand, those users accustomed to specifying the third point to be a midpoint will naturally return the cursor toward first selected point 302 and through left intent zone 332. If the first point is desired to be a midpoint, it will be natural to bring the cursor back through the area of the first point after exiting the left intent zone of the second point. Thus, several different arc drawing commands are effectively combined into one.

Figure 4:
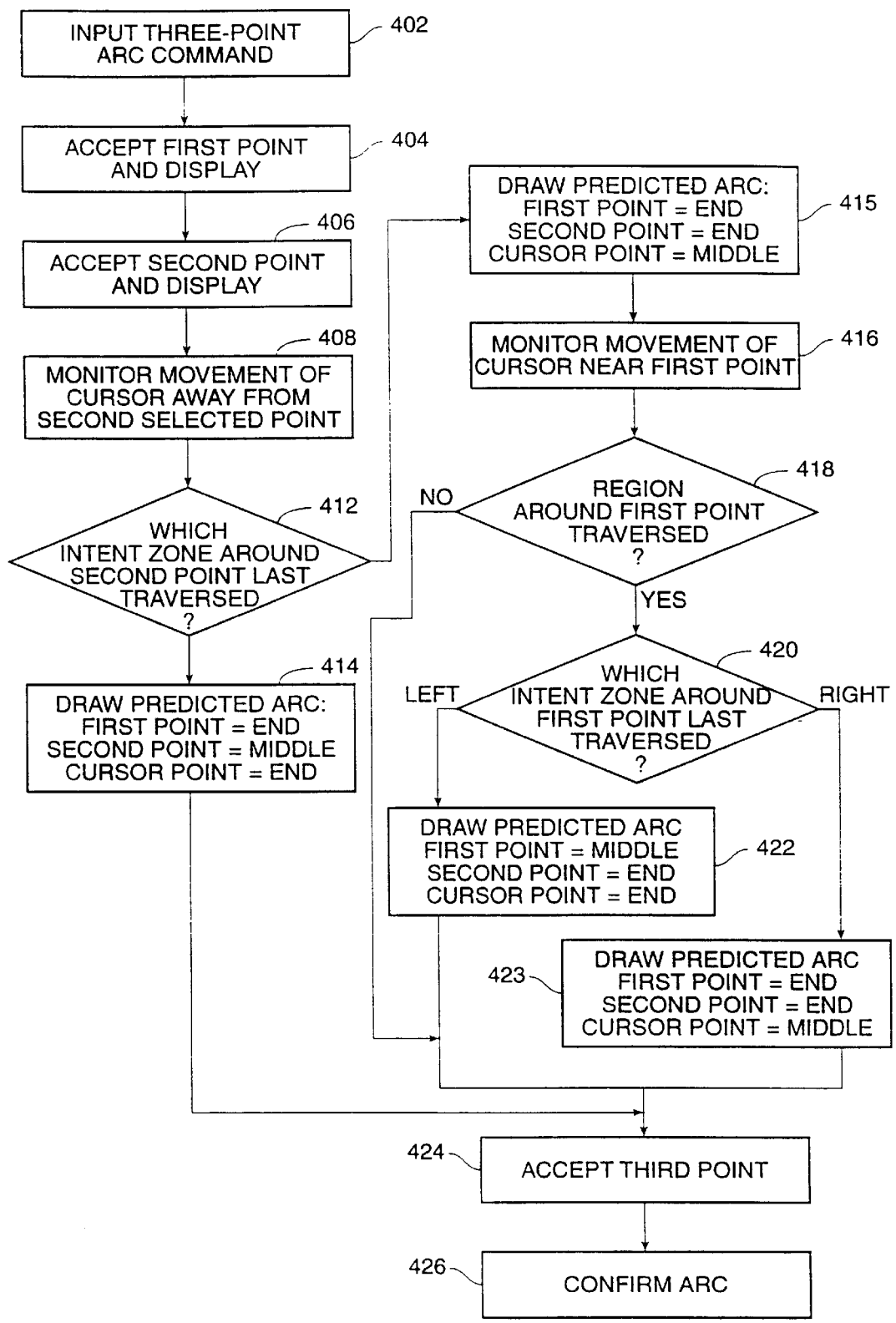
FIG. 4 is a flowchart describing steps of interpreting user input to draw arcs as shown in FIGS. 3A–3D in accordance with the invention.

FIG. 4 is a flowchart describing steps of interpreting user input to draw the arcs shown in FIGS. 3A–3D in accordance with a preferred embodiment of the invention. At step 402, the computer drawing package accepts a command input specifying a three-point arc. The command may be specified via a pull-down menu, by selection from a toolbar, via the keyboard or by other means. At step 404, the computer drawing package accepts first point 302 specified by the user and displays it. At step 406, the drawing package accepts second point 304 specified by the user and displays it. The user is also free to specify a radius of the arc at any time by way of keyboard entry into a displayed radius field. However, this capability is not important to explaining the intent zone feature of the present invention and the remainder of the discussion will assume that no radius value has been entered.

At step 408, after placement of the second point 304, the drawing package monitors movement of the cursor through second region 328. As the cursor is moved further, the arc is displayed in dashed line form corresponding to its final shape and position if the third point were to be selected at the current cursor location.

At step 412, the drawing package determines the identity of the last intent zone of second region 328 traversed by the cursor. If right intent zone 334 was traversed last, the drawing package prepares for the third selected point to be identified as an endpoint and draws the arc in dotted-line form at step 414 accordingly. On the other hand, if left intent zone 336 was traversed last, the drawing package prepares for the third selected point to be identified as a midpoint and draws the arc in dotted-line form at step 415 accordingly.

Figure 5A:
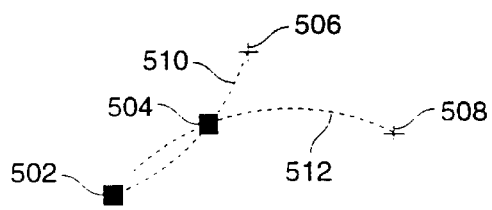
FIGS. 5A–5C depict intermediate displays during the course of drawing an arc according to the procedure of FIG. 4.
Figure 5B:
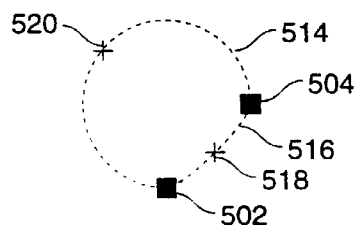
Figure 5C:
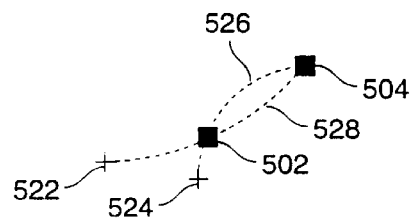

FIGS. 5A–5C depict arcs in dotted line form for particular patterns of cursor movement in accordance with the invention. First point 502 corresponds to first point 302 of FIGS. 3A–3D. Second point 504 corresponds to second point 304 of FIGS. 3A–3D. The different geometric relationship between the first and second points in FIGS. 3A–3D as compared to FIGS. 5A–5C is not important to an understanding of the invention.

FIG. 5A depicts the display generated at step 414 where the current cursor location is on the far side of the second selected point as compared to the first selected point.

FIG. 5A shows that a first selected point 502 is shown as a first endpoint, a second selected point 504 is shown as a midpoint, and the cursor marks the projected location of the third selected point as a second endpoint. Two possible cursor locations 506 and 508 and accompanying arcs 510 and 512 are shown. FIG. 5B depicts the display generated at step 415, with arcs 514 and 516 defined by cursor locations 518 and 520.

If left intent zone 336 around the second point was last traversed, step 415 is followed by step 416. At step 416, the drawing package monitors movement of the cursor to test for movement through region 320 surrounding first selected point 302. At step 418, the drawing package determines if region 320 has been traversed. If region 320 has been traversed (after selection of second point 304), the drawing package then determines which intent zone was traversed at step 420.

If left intent zone 324 was the last portion of region 320 traversed, the situation of FIG. 5C results at step 422. FIG. 5C shows that first selected point 502 is shown as a midpoint, second selected point 504 is shown as a first endpoint, and the cursor marks the projected location of the third selected point as a second endpoint. Two possible cursor locations 522 and 524 and accompanying arcs 526 and 528 are shown. If right intent zone 326 was traversed, an arc is drawn in dotted line form with first point 502 as an endpoint, second point 504 as an endpoint, and the cursor location as an endpoint. For all of FIGS. 5A–5C, the radius, sweep, center, and direction of the dotted-line arc are modified continually as the cursor is moved. Once the third point is specified at step 424, the dotted line form of the arc is confirmed at step 426.

Figure 6:
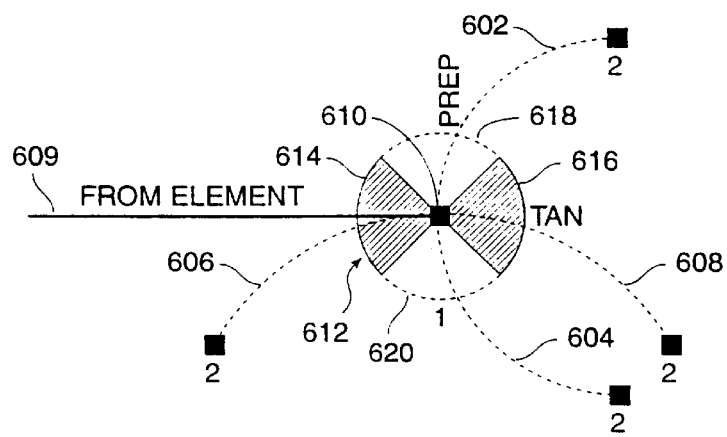
FIG. 6 depicts how an arc may be drawn to be connected to an existing line, wherein the arc may be intended to be perpendicular or tangent to the existing line, and the user's intent is interpreted in accordance with the invention.

FIG. 6 depicts how an arc 602, 604, 606, or 608 may be drawn to be connected to an existing line 609, wherein the arc may be intended to be perpendicular (arc 602 or 604) or tangent (arc 606 or 608) to existing line 609, and the user's intent is interpreted in accordance with the invention. FIG. 6 depicts the displayed situation after a first point 610 has been selected for a number of possible current cursor locations. First selected point 610 is surrounded by a circular region 612 divided into four wedge-shaped equally sized intent zones 614, 616, 618, and 620. Intent zones 614 and 616 face one another and are bisected by existing line 609. Intent zones 618 and 620 also face one another and would be bisected by a line perpendicular to existing line 608. In FIG. 6, the arcs are connected to an endpoint of existing line 609 but connection could also be made to any point along existing line 609.

Figure 7:
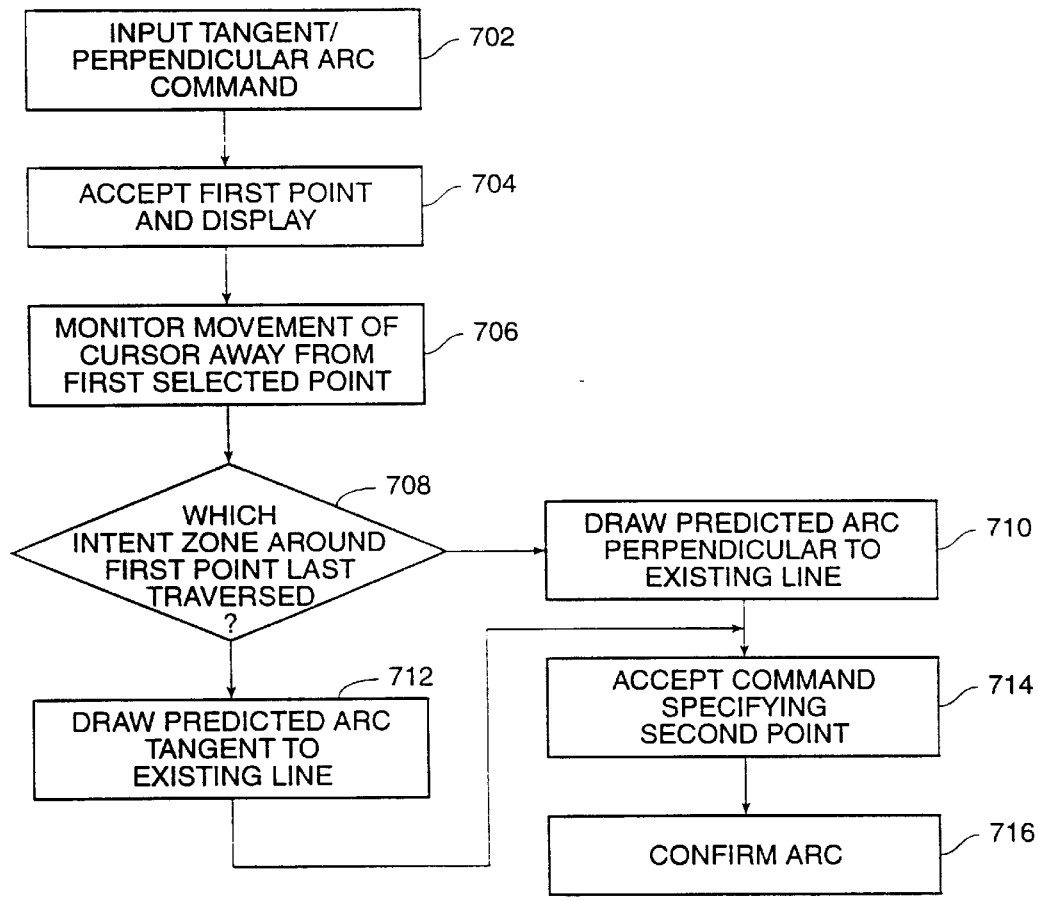
FIG. 7 is a flowchart describing steps of interpreting user input to draw arcs as shown in FIG. 6 in accordance with the invention.

FIG. 7 is a flowchart describing steps of interpreting user input to draw arcs as shown in FIG. 6 in accordance with the invention. At step 702, the computer drawing package accepts a command input specifying that a tangent or perpendicular arc is to be drawn. The command may be specified via a pull-down menu, by selection from a toolbar, via the keyboard, or by other means. At step 704, the computer drawing package accepts first point 610 specified by the user and displays it. This point must be on, or on the end of an existing line such as existing line 608.

At step 706, after placement of the first point 304, the drawing package monitors movement of the cursor through first region 612. As the cursor is moved further, the arc is displayed in dashed line form corresponding to its final shape and position if the second point were to be selected at the current cursor location. At any point during the construction of the arc, the user may numerically specify the radius and/or sweep angle. The discussion here will assume that no such entry has been made since this capability is not important to an explanation of the intent zone feature of the present invention.

At step 708, the drawing package determines which intent zone was last traversed by the cursor. At step 710, if intent zone 618 or intent zone 620 were last traversed (the "perpendicular" intent zone), the arc is drawn in dotted line form as a perpendicular arc leading from existing line 609 to 20 the cursor. At step 712, if intent zone 614 or intent zone 616 (the "tangent" intent zone) were last traversed, the arc is drawn in dotted line form as a tangent arc leading from existing line 608 to the cursor. Once the second point is specified at step 714, the arc is drawn at step 716, confirming the dotted line form of the arc displayed at step 710 or step 712.

Referring again to FIG. 6, from the above discussion it is clear how the depicted arcs can be constructed. The user first specifies the tangent/perpendicular arc command and then specifies first point 610. To draw either of tangent arcs 606 or 608, the user moves the cursor away from selected first point 610 and through intent zone 614 toward the second endpoint of the arc. To draw either of perpendicular arcs 602 or 604, the user draws through intent zone 618 or 620 toward the location of the second endpoint of the arc. In the preferred embodiment, if the user changes his mind after exiting an intent zone, he can change the interpretation of the points by moving the cursor through the correct intent zone. The same command is shared between the two ways of combining an arc with an existing line.

Figure 8:
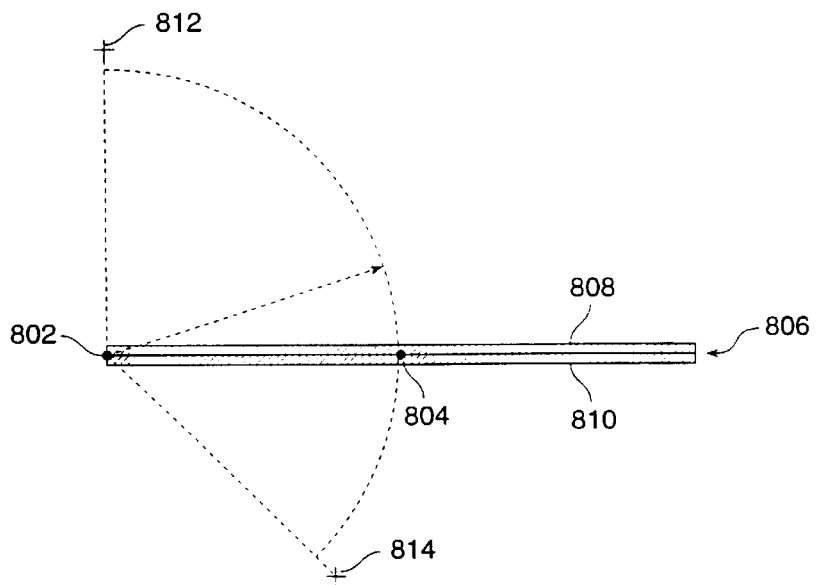
FIG. 8 depicts how an arc may be drawn by specifying a center point of the arc, wherein the arc may be intended to be drawn clockwise or counterclockwise from another specified point, and the user's intent is interpreted in accordance with the invention.

Another way of drawing an arc is to specify a center point of the arc and then the start and the end. FIG. 8 depicts how an arc may be drawn by specifying a center point 802 of the arc, wherein the arc may be intended to be drawn clockwise or counterclockwise from another specified point 804, and the user's intent is interpreted in accordance with the invention. A substantially rectangular region 806 extends from first selected center point 802 beyond second selected point 804 and indefinitely onward. An imaginary line from first selected point 802 through second selected point 804 divides the region into an upper intent zone 808 and a lower intent zone 810. Two possible cursor locations 812 and 814 are also shown.

To draw an arc extending counterclockwise from second selected point 804 to cursor location 812, the user proceeds as follows. The user first selects an arc-by-center command via the toolbar, a pulldown menu or by other means. The user then selects first point 802 as the center and second point 804 as a first endpoint of the arc. To show that the arc is to be drawn counterclockwise, the user moves the cursor away from second selected point 804 through top intent zone 808 toward cursor position 812. At cursor position 812, the user selects the third point. If the user desires a clockwise arc with the same endpoints, he moves the cursor through bottom intent zone 810 on its way toward cursor position 814.

To draw an arc extending clockwise from second selected point 804 to cursor location 814, a similar procedure is followed. The user first selects the same arc-by-center command. The user then selects first point 802 as the center and second point 804 as a first endpoint of the arc. To show that the arc is to be drawn clockwise, the user moves the cursor away from second selected point 804 through bottom intent zone 810 toward cursor location 814. At cursor location 814, the user selects the third point. If the user desires a counterclockwise arc, he moves the cursor through top intent zone 808 on its way toward cursor position 814.

Thus, the drawing of clockwise and counterclockwise arcs with specified center points is combined into a single command. The use of depicted intent zones 808 and 810 to interpret the user's commands in accordance with the invention corresponds to the natural way of drawing them since the user will likely move the cursor to roughly trace the path of the desired arc.

Figure 9:
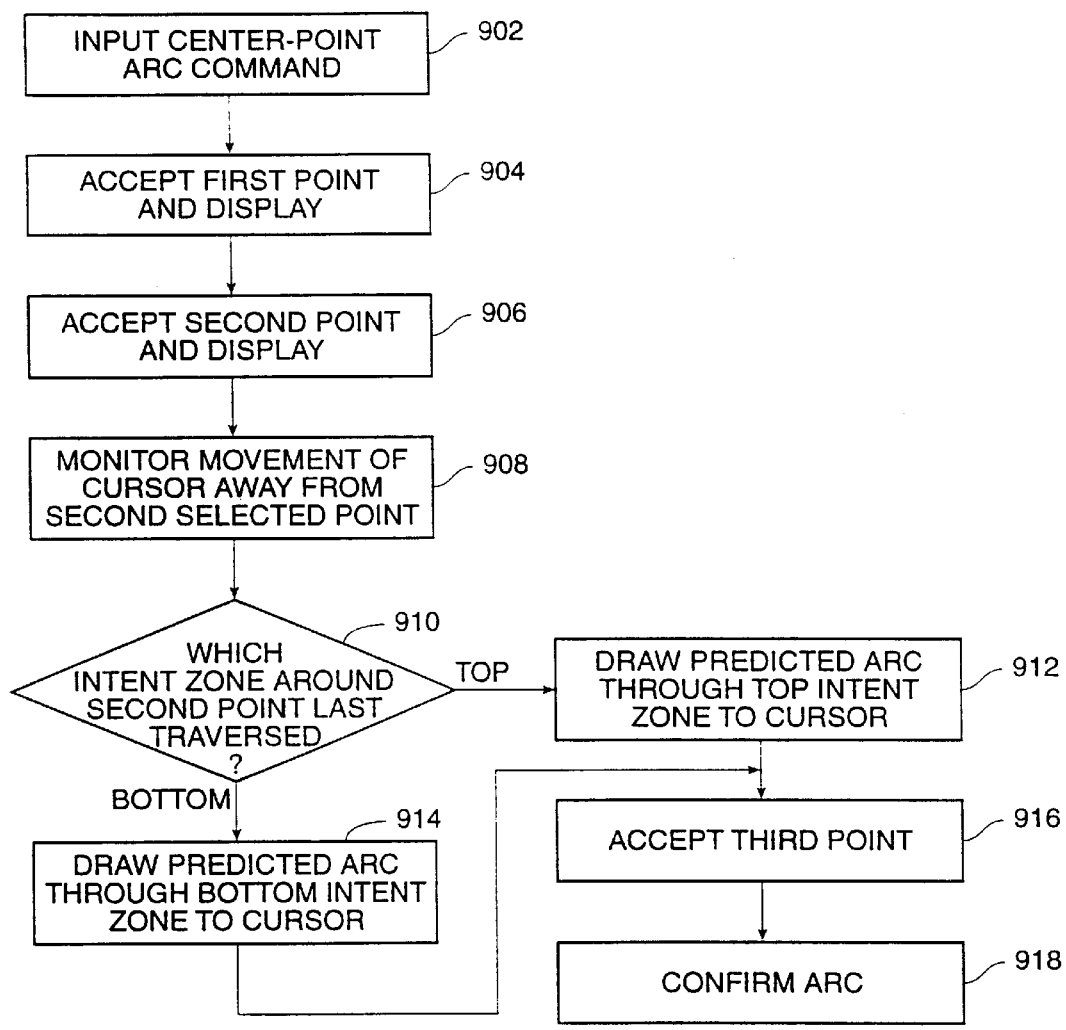
FIG. 9 is a flowchart describing steps of interpreting user input to draw arcs as shown in FIG. 8 in accordance with the invention.

FIG. 9 is a flowchart describing steps of interpreting user input to draw arcs as shown in FIG. 8 in accordance with the invention. At step 902, the computer drawing package accepts a command input specifying that an arc is to be drawn by specifying the center point. The command may be specified via a pull-down menu, by selection from a toolbar, via the keyboard, or by other means. At step 904, the computer drawing package accepts first point 802 specified by the user and displays it. At step 906, the drawing package of the preferred embodiment accepts second point 804 specified by the user and displays it. At any point during the construction of the arc, the user may numerically specify the radius and/or sweep angle. The discussion here will assume that no such entry has been made since this capability is not important to an explanation of the intent zone feature of the present invention.

The preferred embodiment then monitors cursor movement away from second selected point 804 at step 908. At step 910, the preferred embodiment determines which intent zone was traversed last. If top intent zone 808 was traversed last, then, at step 912, an arc is drawn in dotted line form counterclockwise from second selected point 804 to the current 30 cursor location. If bottom intent zone 810 was traversed last, then, at step 914, an arc is drawn in dotted line form clockwise from second selected point 804 to the current cursor location. Once the third point is specified at step 916, the arc is drawn at step 918, confirming the dotted line form of the arc displayed at step 912 or step 914.

Figure 10:
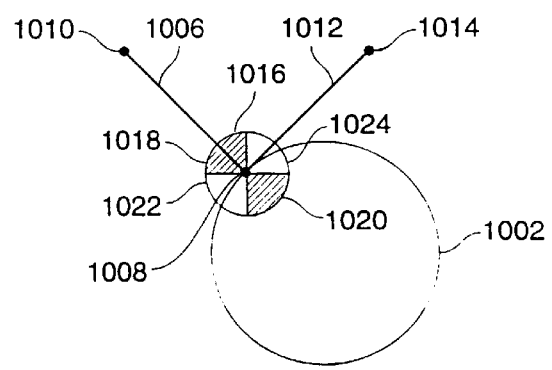
FIG. 10 depicts how a line may be drawn to be connected to an existing arc or circle, wherein the line may be intended to be perpendicular or tangent to the existing line, and the user's intent is interpreted in accordance with the invention.

FIG. 10 depicts how a line may be drawn to be connected to an existing arc or circle, wherein the line may be intended to be perpendicular or tangent to the existing line, and the user's intent is interpreted in accordance with the invention. FIG. 10 shows an existing circle 1002. A line 1006 is shown, perpendicular to circle 1002, and extending from a point 1008 on circle 1002 to a point 1010. A line 1012 is also shown, tangent to circle 1002, and extending from point 1008 to a point 1014. A circular region 1016 surrounding point 1008 is divided into four wedge-shaped equally-sized intent zones 1018, 1020, 1022, and 1024. Intent zones 1018 and 1020 face one another and are traversed by an infinite line that would include line 1006. Intent zones 1022 and 1024 also face one another and are traversed by an infinite line including tangent line 1014. Any arc or curve could substitute for circle 1002.

Figure 11:
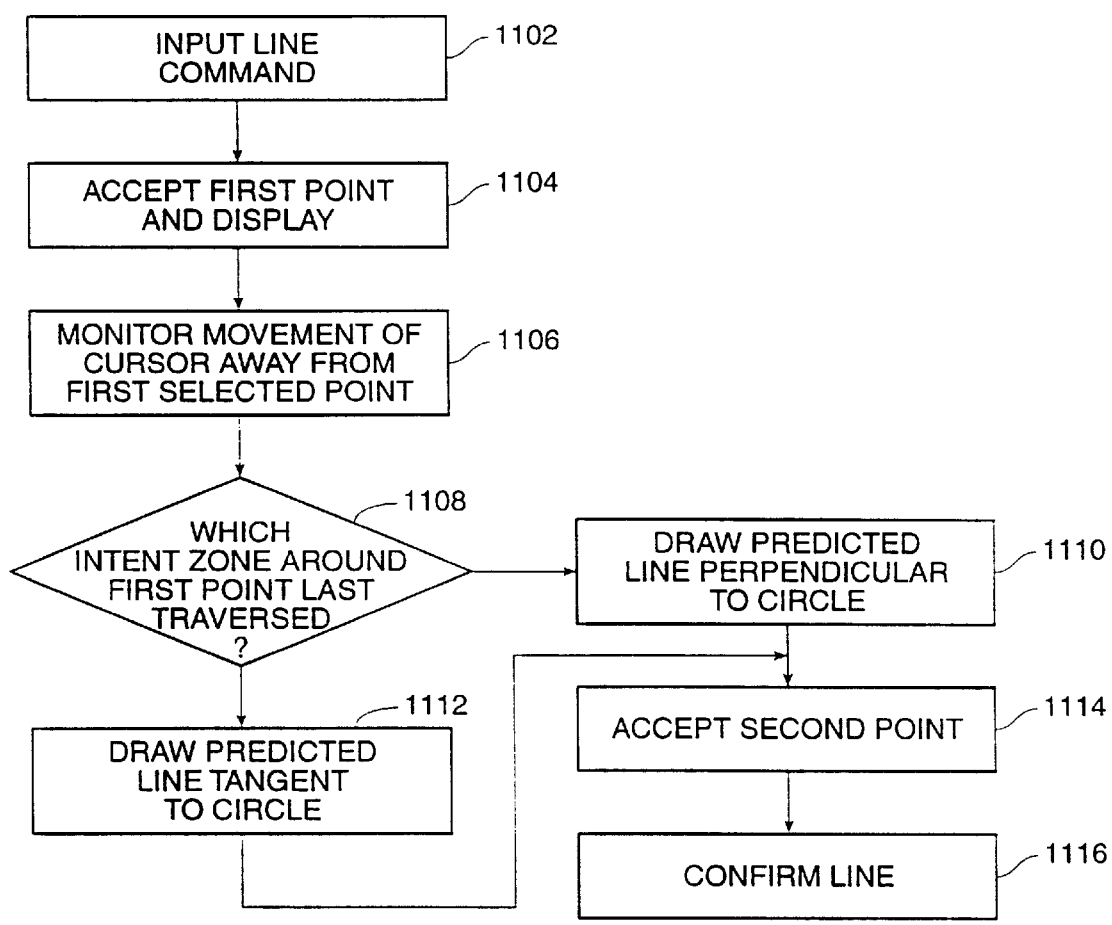
FIG. 11 is a flowchart describing steps of interpreting user input to draw a line as shown in FIG. 10 in accordance with the invention.

FIG. 11 is a flowchart describing steps of interpreting user input to draw a line as shown in FIG. 10 in accordance with the invention. To draw line 1006 or 1012 in accordance with the invention, the procedure begins by accepting a user line drawing command input at step 1102, whether by pulldown menu, toolbar selection or in some other way. At step 1104, the drawing package accepts as an input a selection of a first point on circle 1002. If the first point were not located on circle 1002, a conventional line drawing interaction would begin. Initially, the location of displayed point 1008 coincides with the location of the initial selection.

At step 1106, the drawing package monitors cursor movement away from the first selected point to determine which intent zone was last traversed. At step 1108, the drawing package determines which intent zone was last traversed. If intent zones 1018 or 1020 were last traversed (the "perpendicular" intent zones), the drawing package draws a dotted line from the cursor to displayed point 1006 perpendicular to circle 1002 at step 1110. If intent zone 1022 or 1024 were last traversed (the "tangent" intent zones), the drawing package draws a dotted line from the cursor to displayed point 1008 tangent to circle 1002 at step 1112. As the cursor moves, displayed point 1008 floats so that the dotted line leading from the cursor to displayed point 1008 is always perpendicular or tangent to circle 1002 depending on the cursor position. Once the second point is specified at step 1114, the line is drawn at step 1116, confirming the dotted line form of the arc displayed at step 1110 or step 1112.

Again, the cursor movement away from the selected point provides a cue as to the user's intentions. Two commands, a tangent line drawing command, and a perpendicular line drawing command are beneficially consolidated into the conventional line drawing command.

The Appendix includes a source code listing suitable for implementing one instantiation of the invention. The source code of the Appendix is written in Visual C++ suitable for compilation and execution on an IBM-compatible computer running Windows NT or Windows95. "Visual C++", "windows NT", and "Windows95" are trademarks of Microsoft Corporation.

The Appendix includes the implementation files, "SkArccmd.cpp", "SkLineCmd.cpp", "SkTanprepzone.cpp", "Zonehelp.cpp", and corresponding header files, "SkArcCmd.h", "SkLineCmd.h", "SkTanprepzone.h" and "Zonehelp.h." The source code contained in these files implements the drawing commands described in the present application within the context of a drawing package. The "SkArcCmd" files implement the arc drawing commands. The "SkLineCmd" files implement the line drawing commands. The "SkTanprepzone" and "Zonehlp" files include code for implementing the intent zone feature of the present invention.

While the above is a complete description of the preferred embodiments of the invention, various alternatives, modifications and equivalents may be used. It should be evident that the present invention is equally applicable by making appropriate modifications to the embodiments described above. Therefore, the above description should not be taken as limiting the scope of the invention which is defined by the metes and bounds of the appended claims.

What is claimed is:

1. A method for a computer system having a display and a user input device, comprising:

displaying a first user selection on the display, the first user selection of a first point on the display, the first user selection determined in response to input from the user input device;

displaying a second user selection on the display, the second user selection of a second point on the display, the second user selection determined in response to input from the user input device;

displaying a first arc object on the display in response to the first user selection, the second user selection, and to a first movement of the user input device, the first movement in a first direction relative to the first point on the display, the first direction determined at a predetermined distance from the first point; and alternatively displaying a second arc object on the display in response to the first user selection, the second user selection, and to a second movement of the user input device, the second movement in a second direction relative to the first point on the display, the second direction determined at the predetermined distance from the first point D1.

2. The method of claim 1 wherein the first point is a point on a third object on the display; and wherein the arc intersects and is perpendicular to the third object on the display at the first point.

3. The method of claim 1 wherein the first point is a point on a third object on the display; and wherein the arc intersects and is tangential to the third object on the display at the first point.

4. The method of claim 2 wherein the first point is an endpoint of the arc.

5. The method of claim 1 wherein the first point is a center point of the arc.

6. The method of claim 1 further comprising displaying a cursor location on the display, the cursor location at a third point on the display, the cursor location determined in response to input from the user input device, wherein displaying the first object on the display comprises displaying the first object on the display in response to the first user selection, to the second user selection, to the cursor location and to the first movement of the user input device, the first movement in the first direction relative to the first point on the display.

7. The method of claim 6 wherein the first point, the second point, and the third point are on the arc.

8. The method of claim 6 wherein the second point is at an endpoint of the arc.

9. The method of claim 6 wherein the first point is at an endpoint of the arc.

10. The method of claim 6 further comprising displaying indicia on the display, the indicia providing a visual indication of the first direction relative to the second point on the display, a visual indication of the second direction relative to the second point on the display, and a visual indication of the predetermined distance from the second point.

11. A computer system having a processor, a display, and a user input device, also comprising:

means that directs the processor to display a first user selection on the display, the first user selection of a first point on the display, the first user selection determined in response to input from the user input device;

means that directs the processor to display a second user selection on the display, the second user selection of a second point on the display, the second user selection determined in response to input from the user input device the second user selection after the first user selection;

means that directs the processor to display a first line object on the display in response to the first user selection, to the second user selection, and to a first movement of the user input whereby the first and second arc objects are non co-centric. device, the first movement in a first direction relative to the first point on the display, the first direction determined at a predetermined distance from the first point; and means that directs the processor to display a second line object on the display in response to the first user selection, to the second user selection, and to a second movement of the user input device, the second movement in a second direction relative to the first point on the display, the second direction determined at the predetermined distance from the first point, wherein the codes reside on a tangible media.

whereby the first and second line objects are non co-linear.

12. The computer system of claim 11 wherein the first point is a point on a third object on the display; and wherein the line intersects and is perpendicular to the third object on the display at the first point.

13. The computer system of claim 11 wherein the first point is a point on a third object on the display; and wherein the line intersects and is tangential to the third object on the display at the first point.

14. The computer system of claim 11 wherein the first point is an endpoint of the line.

15. The computer system of claim 11 within the tangible media also includes code that directs the processor to display indicia on the display, the indicia providing a visual indication of the first direction relative to the first point on the display, a visual indication of the second direction relative to the first point on the display, and a visual indication of the predetermined distance from the first point.

16. A computer program product for a computer system having a display and a user input device comprises:

code that directs the processor to display a first user selection on the display, the first user selection of a first point on the display, the first user selection determined in response to input from the user input device;

code that directs the processor to display a second user selection on the display, the second user selection of a second point on the display, the second user selection determined in response to input from the user input device, the second user selection after the first user selection;

code that directs the processor to display a cursor moving on the display at a predetermined distance from the second point, the cursor moving in a direction relative to the second point on the display;

code that directs the processor to display a first arc object on the display in response to the first user selection, to the second user selection, and to the direction, the direction relative to the first point on the display in a first direction; and code that directs the processor to display a second arc object on the display in response to the first user selection, to the second user selection, and to the direction, the direction relative to the first point on the display in a second direction, wherein the codes reside on a tangible media.

whereby the first and second arc objects are non co-centric.

17. The computer program product of claim 16 wherein the first point is a point on a third object on the display; and wherein the arc intersects the third object on the display at the first point.

18. The computer program product of claim 17 wherein the arc intersects the third object in an orientation selected from the group: orthogonal, tangential.

19. The computer program product of claim 16 wherein the first direction and the second direction are orthogonal.

20. The computer program product of claim 16 wherein the tangible media further comprises code that directs the processor to display an indicia on the display, the indicia providing a visual indication of the first direction relative to the second point on the display, a visual indication of the second direction relative to the second point on the display, and a visual indication of the predetermined distance from the second point.

* * * * *